US009963170B2

United States Patent
Haga et al.

(10) Patent No.: US 9,963,170 B2
(45) Date of Patent: May 8, 2018

(54) VEHICLE FRONT STRUCTURE

(71) Applicant: HONDA MOTOR CO., LTD., Tokyo (JP)

(72) Inventors: Akira Haga, Wako (JP); Tomohito Kamada, Wako (JP); Takehiro Kondo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 242 days.

(21) Appl. No.: 15/081,607

(22) Filed: Mar. 25, 2016

(65) Prior Publication Data
US 2016/0280272 A1   Sep. 29, 2016

(30) Foreign Application Priority Data

Mar. 27, 2015 (JP) .................. 2015-067504
Aug. 25, 2015 (JP) .................. 2015-166110

(51) Int. Cl.
*B62D 21/15* (2006.01)
*B62D 27/02* (2006.01)

(52) U.S. Cl.
CPC ......... *B62D 21/152* (2013.01); *B62D 27/023* (2013.01)

(58) Field of Classification Search
CPC .......................... B62D 21/152; B62D 27/023
USPC ....... 296/187.1, 187.09, 193.09, 30; 293/133
See application file for complete search history.

(56) References Cited

U.S. PATENT DOCUMENTS

| 9,027,695 | B2 * | 5/2015 | Nakamura | B62D 21/155 180/247 |
| 2004/0130167 | A1 * | 7/2004 | Mori | B60R 19/18 293/102 |
| 2012/0187720 | A1 * | 7/2012 | Tomozawa | B62D 21/155 296/187.09 |
| 2012/0248820 | A1 * | 10/2012 | Yasui | B60R 19/34 296/187.09 |
| 2014/0062106 | A1 * | 3/2014 | Han | B60R 19/34 293/133 |
| 2014/0062129 | A1 * | 3/2014 | Syed | B60R 19/24 296/187.1 |
| 2014/0091585 | A1 * | 4/2014 | Ramoutar | B60R 19/24 293/133 |

(Continued)

FOREIGN PATENT DOCUMENTS

JP          2013-212757 A    10/2013

*Primary Examiner* — Jason S Morrow
*Assistant Examiner* — E Turner Hicks
(74) *Attorney, Agent, or Firm* — Westerman, Hattori, Daniels & Adrian, LLP

(57) ABSTRACT

A vehicle front structure includes a front side frame and a first load transmitting member that is joined to a front end and an outer surface in a vehicle-width direction of the front side frame and that tapers from the front of the vehicle toward the rear so as to be formed substantially in the shape of a triangle when viewed in plan view. The first load transmitting member includes a substantially U-shaped portion that is open toward the front side frame. A longitudinal-plate-like second load transmitting member is joined to and along the bottom of the substantially U-shaped portion. A closed cross section is formed by the bottom of the first load transmitting member and the second load transmitting member in a continuous manner in the longitudinal direction of the vehicle.

20 Claims, 11 Drawing Sheets

(56) References Cited

U.S. PATENT DOCUMENTS

| | | | | |
|---|---|---|---|---|
| 2014/0361559 A1* | 12/2014 | Sakakibara | ............. | B60R 19/34 293/133 |
| 2014/0361560 A1* | 12/2014 | Sakakibara | ............. | B60R 19/34 293/133 |
| 2015/0035316 A1* | 2/2015 | Kuriyama | ............ | B62D 25/082 296/187.1 |

* cited by examiner

VEHICLE FRONT STRUCTURE

CROSS REFERENCES TO RELATED APPLICATIONS

The present application claims priority under 35 U.S.C. § 119 to Japanese Patent Applications No. 2015-067504, filed Mar. 21, 2015 and No. 2015-166110 filed Aug. 25, 2015, both entitled "Vehicle Front Structure." The contents of this application are incorporated herein by reference in their entirety.

TECHNICAL FIELD

The present disclosure relates to a technology for improving a vehicle front structure.

BACKGROUND

As a conventional technology for the vehicle front structure, there is known a technology disclosed in Japanese Unexamined Patent Application Publication No. 2013-212757.

The vehicle front structure disclosed in Japanese Unexamined Patent. Application Publication No. 2013-212757 includes right and left, front side frames extending in a longitudinal direction of a vehicle, right and left first load transmitting members that are substantially triangular-shaped when viewed in plan view and that are joined to front ends and outer surfaces in a vehicle-width direction of the front side frames, respectively, right and left coupling members that couple the front ends of the front side frames and front ends of the first load transmitting members together, and right and left bumper beam extensions extending forward from the coupling members, in which a bumper beam is placed across the bumper beam extensions and a power unit is located between the right, and left front side frames. The load transmitting members are members that taper in width from the front of the vehicle toward the rear.

There is a possibility that the vehicle described above may be subjected to an incoming impact load from the outside in a vehicle-width direction. In the event of a so-called narrow offset impact, an impact load is transmitted to one of the front side frames through one of the load transmitting members. An impact load transmitted to one of the front side frames is transmitted to the other one of the front, side frames on the opposite side via the power unit, whereby an impact load can be absorbed by the entire vehicle front structure.

In order to securely transmit an impact, load, the vehicle front structure described above requires a highly strengthened load transmitting member. This is because a load transmitting member that, may be easily deformed cannot provide a required impact-energy absorption capability. Typically, it is necessary to use a particular material, such as high-tensile material, or a thicker steel plate in order to strengthen the load transmitting member. However, the use of such a particular material will result in an increase in parts cost or the use of a thicker steel plate will result in an increase in weight.

SUMMARY

The present application describes an inexpensive, lightweight, and high impact-energy absorbing vehicle front structure.

A first aspect of the present application provides a vehicle front structure which includes right and left front side frames extending in a longitudinal direction of a vehicle, right and left first load transmitting members that are joined to front ends and outer surfaces in a vehicle-width direction of the right and left front side frames, respectively, and that taper in width from a front of the vehicle toward a rear so as to be formed substantially in the shape of a triangle when viewed in plan view, and right and left coupling members that are joined to the front ends of the front side frames and front ends of the first load transmitting members in a continuous manner so as to couple the front side frames and the first load transmitting members together, in which the first load transmitting members include substantially U-shaped portions that are open toward the front side frames, in which right and left longitudinal-plate-like second load transmitting members are joined to and along bottoms of the substantially U-shaped portions, and in which the first load transmitting members have first grooves formed at parts of bottoms thereof away from the second load transmitting members and/or the second load transmitting members have second grooves formed at parts thereof away from the bottoms whereby closed cross sections are formed by the bottoms of the first load transmitting members and the second load transmitting members in a continuous manner in the longitudinal direction of the vehicle. With this arrangement, in the event of a narrow offset impact in which an impact load is applied to the outer side in the vehicle-width direction, such an impact load is transmitted from the bottom of the first load transmitting member and the second load transmitting member to the front side frame. A closed cross section formed by the bottom of the first load transmitting member and the second load transmitting member reduces or prevents a deformation of these members or portions caused by an impact load. No expensive material needs to be used for the first load transmitting member and the second load transmitting member to reduce or prevent such a deformation. In addition, compared with a load transmitting member having a larger plate thickness, an increase in weight can also be reduced or prevented because of the structure in which the second load transmitting member is simply joined to the bottom. Consequently, a high impact-energy absorbing vehicle front structure can be provided despite being inexpensive and lightweight.

A second aspect of the present application provides the vehicle front structure of the first aspect, in which the second load transmitting members are preferably continuous from the first load transmitting members so as to be joined to the front side frames. Here, an apex of the first load transmitting member easily becomes detached from the front side frame when viewed in plan view. The extension of the second load transmitting member to the front side frame enables a rearward apex of the first load transmitting member to be placed between the second load transmitting member and the front side frame. This prevents the first, load transmitting member from being detached from the front side frame, whereby an impact, load can be more securely transmitted to the front side frame.

A third aspect of the present application provides the vehicle front structure of the first aspect, in which, preferably, the front side frames have fragile portions formed in the rear of the first load transmitting members and rear ends of the second load transmitting members extend close to the fragile portions beyond rear ends of the first load transmitting members. This enables an impact load to be securely transmitted close to the fragile portion at which the front side frame can be forced to be bent. With this arrangement, impact energy can be absorbed in a stable manner. If the power unit is used to absorb impact energy, settings must be changed according to the type of the power unit. In this disclosure, the front side frame is made to bend at the fragile portion, eliminating the need for changing the settings according to the type of the power unit, which enhances the versatility of the technology disclosed in the present application.

A fourth aspect of the present application provides the vehicle front structure of the first aspect further comprises a coupling member joined to the front end of the front side frame and a front, end of the first load transmitting member in a continuous manner so as to couple the front, side frame and the first load transmitting member together. The second load transmitting members are preferably continuous from the first load transmitting members so as to be joined to the coupling members. With this arrangement, an apex of the first load transmitting member easily becomes detached from the coupling member when viewed in plan view. The extension of the second load transmitting member to the coupling member enables a forward apex of the first load transmitting member to be placed between the second load transmitting member and the coupling member. This prevents the first load transmitting member from being detached from the coupling member, whereby an impact load can be more securely transmitted to the front side frame.

A fifth aspect of the present application provides the vehicle front structure of the first aspect, in which the second load transmitting member includes an upper horizontally extending portion extending horizontally from an upper end of thereof and a lower extending portion extending horizontally from a lower end of thereof. This enhances bending rigidity of the second load transmitting member, which reduces or prevents a deformation caused by an impact load and enables an impact load to be more securely transmitted to the front side frame.

A sixth aspect of the present application provides the vehicle front structure of the first aspect which preferably further includes right and left lower members that extend in the longitudinal direction on the outer side in the vehicle-width direction of the front side frames, in which the second load transmitting members are preferably connected to the lower members at front ends and outer sides in the vehicle-width direction thereof. With this arrangement, the lower member is made to deform in conjunction with the deformation of the front side frame, whereby more impact energy can be absorbed.

A seventh aspect of the present application provides the vehicle front structure of the first aspect which preferably further includes right and left bumper beam extensions that are mounted on the fronts of the coupling members/respectively, and are collapsible or deformable so as to be able to absorb an impact load, in which the bumper beam extensions preferably extend from the fronts of the front side frames to the fronts of the lower members. The disposition of the bumper beam extension in front of the first and second load transmitting members enables an impact load to be more securely transmitted from the first and second load transmitting members to the front side frame as well as the lower member in the event of a narrow offset impact.

An eighth aspect of the present application provides a vehicle front structure which includes a front side frame extending in a longitudinal direction of a vehicle, a first load transmitting member joined to a front end and an outer surface in a vehicle-width direction of the front side frame, the first load transmitting member having a width tapering from a front of the vehicle toward a rear of the vehicle so as to have a substantially triangle shape when viewed in plan view, and a longitudinal-plate-shape second load transmitting member extending along the first load transmitting member so as to sandwich the first load transmitting member between the second load transmitting member and the front side frame. The first load transmitting member includes an upper first load transmitting member made of a first plate member and a lower first load transmitting member made of a second plate member different from the first plate member, the upper first load transmitting member being joined to an upper part of the front side frame, and the lower first load transmitting member being joined to a lower part of the front side frame. The upper first load transmitting member includes an upper flange portion extending downward and joined to the second load transmitting member. The lower first load transmitting member includes a lower flange portion extending upward and joined to the second load transmitting member. The front side frame, the upper first load transmitting member, the lower first load transmitting member and the second load transmitting member profile a closed cross section, and a second groove is disposed in the second load transmitting member. The front side frame includes a left, front side frame and a right front side frame. In this structure, the front side frame, the plate-shaped upper first load transmitting member, the plate-shaped lower first, load transmitting member, and the longitudinal plate shaped second load transmitting member form a closed cross section. In the event of a narrow offset impact in which an impact load is applied to the outer side in the vehicle-width direction, such an impact load is transmitted from the first load transmitting member and the second load transmitting member to the front side frame. A thus formed closed cross section reduces or prevents a deformation of these members or portions caused by an impact load. No expensive material needs to be used for the first load transmitting member and the second load transmitting member to reduce or prevent such a deformation. In addition, compared with a load transmitting member having a larger plate thickness, an increase in weight can also be reduced or prevented because of the structure in which the three plate members are simply joined to one another. Consequently, a high impact-energy absorbing vehicle front structure can be provided despite being inexpensive and lightweight.

In addition, the first load transmitting member is made of the plate shaped upper first load transmitting member and the plate shaped lower first load transmitting member. By constituting the first load transmitting member using the two plate shaped members, the first load transmitting member may be formed by using press molding process only.

A ninth aspect of the present application provides the vehicle front structure of the first aspect, in which the upper first load transmitting member includes an upper bead profiled along each side of the substantially triangle shape. The lower first load transmitting member includes a lower bead profiled along each side of the substantially triangle shape, and the upper bead and the lower bead each have substantially triangle shape. In this structure, the upper first load transmitting member and the lower first load transmitting member include substantially triangle upper and lower beads which are formed along each side of the triangle shape, respectively. This enhances bending rigidity of the first load transmitting member, which reduces or prevents the deformation caused by an impact load and enables an impact load to be more securely transmitted to the front side frame.

In this structure, ridgelines are provided by forming the upper bead and the lower bead. Thus, the impact load may be transmitted to the front side frame through thus provided ridgelines and enables the impact load to be more securely transmitted to the front side frame.

A tenth aspect of the present application provides the vehicle front structure of the first aspect, in which the upper bead includes an upper opening profiled along each side of the upper bead, and the lower bead includes a lower opening profiled along each side of the lower bead. In this structure, the substantially triangle upper and lower openings are formed along each side of the upper bead and the lower bead, respectively. The inside parts of the upper bead and the lower bead have less contribution to the transmission of the impact load. The inside parts of the upper bead and the lower bead include the upper opening and the lower opening formed therein. This structure allows reducing weight while preventing decrease in impact load transmission efficiency.

BRIEF DESCRIPTION OF THE DRAWINGS

The advantages of the disclosure will become apparent in the following description taken in conjunction with the following drawings.

DETAILED DESCRIPTION

An embodiment, of the present application will be described below with reference to the attached drawings. In this description, references to "right" and "left" of the vehicle are relative to the position of the driver in the driver's seat, while references to "front" and "rear" are relative to the direction in which a vehicle travels. In addition, references to "Fr", "Rr", "Le", "Ri", "Up", "Dn", and "Ce" in the attached drawings are relative to the driver's position, representing the front, rear, left, right, upside, downside, and center in the vehicle-width direction of the vehicle, respectively.

First Embodiment

Figure 1:
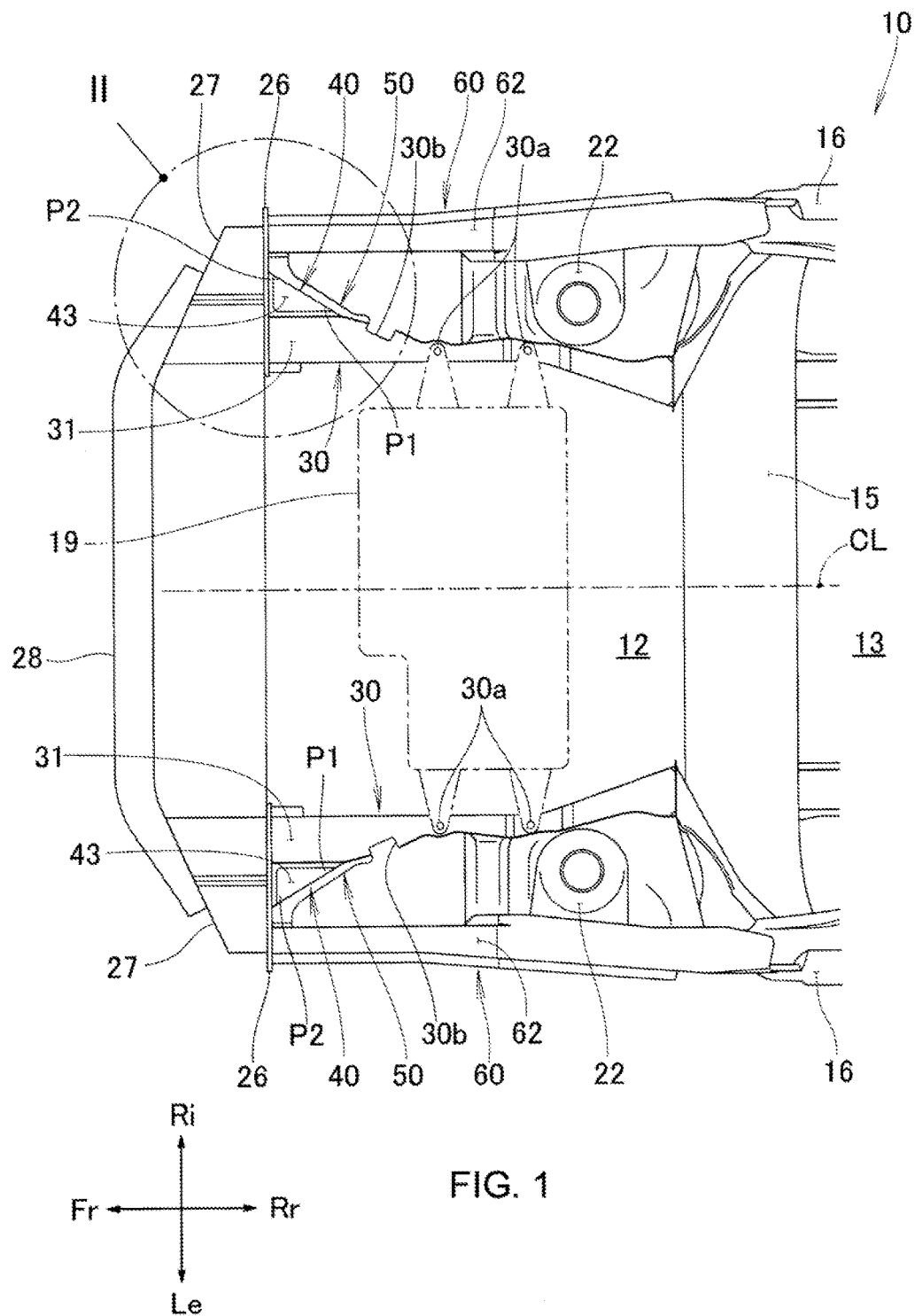
FIG. 1 is a plan view of a vehicle front structure according to a first embodiment of the present disclosure.

With reference to FIG. 1, a vehicle body 10 has an engine compartment 12 at the front thereof and a passenger compartment 13 located just behind the engine compartment 12, as shown in FIG. 1. The vehicle body 10 includes a monocoque body that is substantially symmetrical about a vehicle-width center line CL extending in the longitudinal direction of the vehicle through the center in the vehicle-width direction.

The engine compartment 12 and the passenger compartment 13 are partitioned with a dashboard lower panel 15. Both ends of the dashboard lower panel 15 are joined to right and left front pillars 16, 16, respectively.

The vehicle body 10 includes right and left front side frames 30, 30 and right and left lower members 60, 60 that, when viewed in plan view, are located on the outer-side of the right and left front side frames 30, 30. The right and left front side frames 30, 30 are located at the right and left ends of the front of the vehicle body 10 and extend in the longitudinal direction of the vehicle body 10. A power unit 19 is disposed between the right and left front side frames 30, 30.

The right and left damper housings 22, 22 are placed over and across the right and left front side frames 30, 30 and the right and left lower members 60, 60, respectively.

FIGS. 2 through 5 show the right front section of the vehicle front structure. The left front section has the same structure as the right front section. Accordingly, descriptions of only the right front section will be provided below and descriptions of the left front section will be omitted. Descriptions of the right front section may be replaced by descriptions of the left front section, when relevant.

Figure 2:
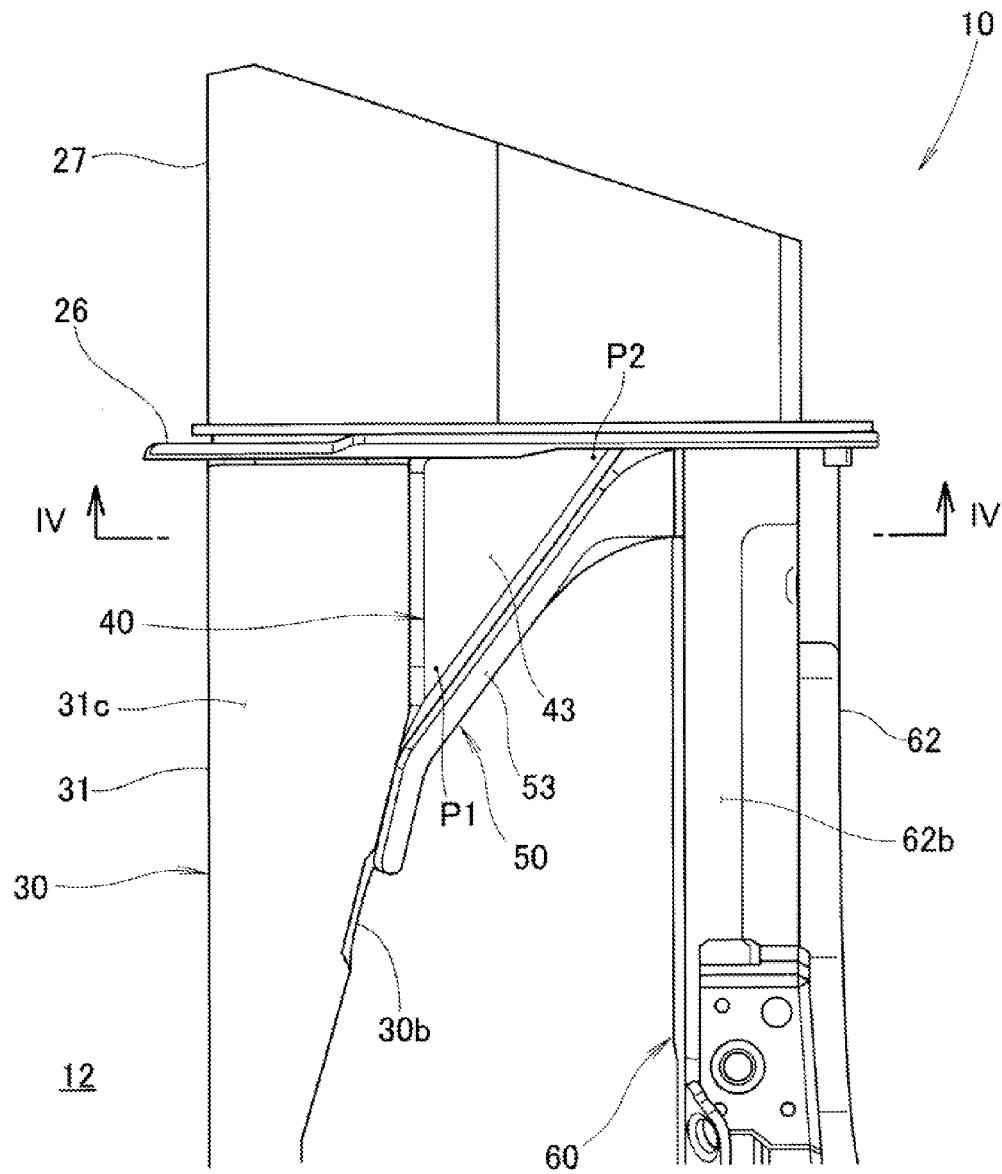
FIG. 2 is a enlarged view of a section II of FIG. 1.
Figure 2:
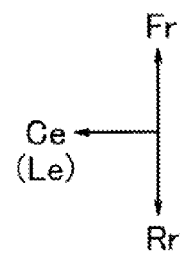
Figure 3:
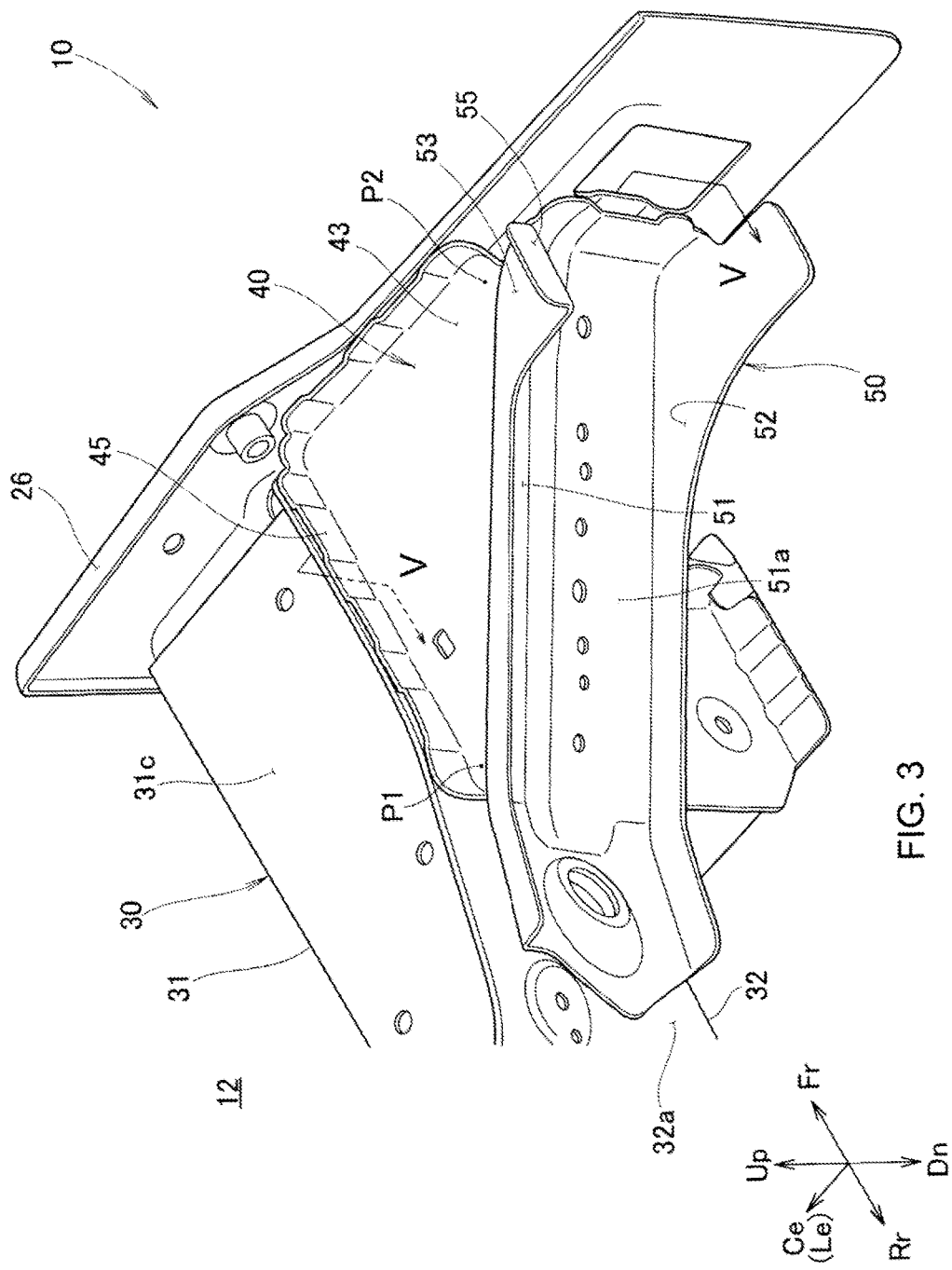
FIG. 3 is a perspective view of a front side frame, a first load transmitting member, a second load transmitting member, and a coupling member shown in FIG. 2.

With reference to FIGS. 2 and 3, a first load transmitting member 40 that is substantially triangular-shaped when viewed in plan view is joined to the front side frame 30 so as to contact with a front end and an outer-surface in the vehicle-width direction of the front side frame 30. A second load transmitting member 50 like a longitudinal plate is joined to the first load transmitting member 40 so as to be disposed along the first load transmitting member 40. The second load transmitting member 50 is joined to the lower member 60 at a front end and an outer side in the vehicle-width direction thereof. The front side frame 30, the first load transmitting member 40, the second load transmitting member 50, and the lower member 60 are joined at front ends thereof to a coupling member 26 made of a metal plate. A bumper beam extension 27 that can absorb an impact load through deformation is joined to a front, end of the coupling member 26.

With reference to FIG. 1, a bumper beam 28 is placed across the right and left bumper beam extensions 27.

The front side frame 30 has a mount fastening portion 30a for fastening the power unit 19 and a fragile portion 30b that is located in front of the mount fastening portion 30a and in the rear of the first load transmitting member.

The fragile portion 30b is a substantially U-shaped part when viewed in plan view and has a smaller width than adjacent parts. The fragile portion 30b has a smaller sectional area than any other part in the front side frame 30 and, as a result, has lower bending rigidity.

Figure 4:
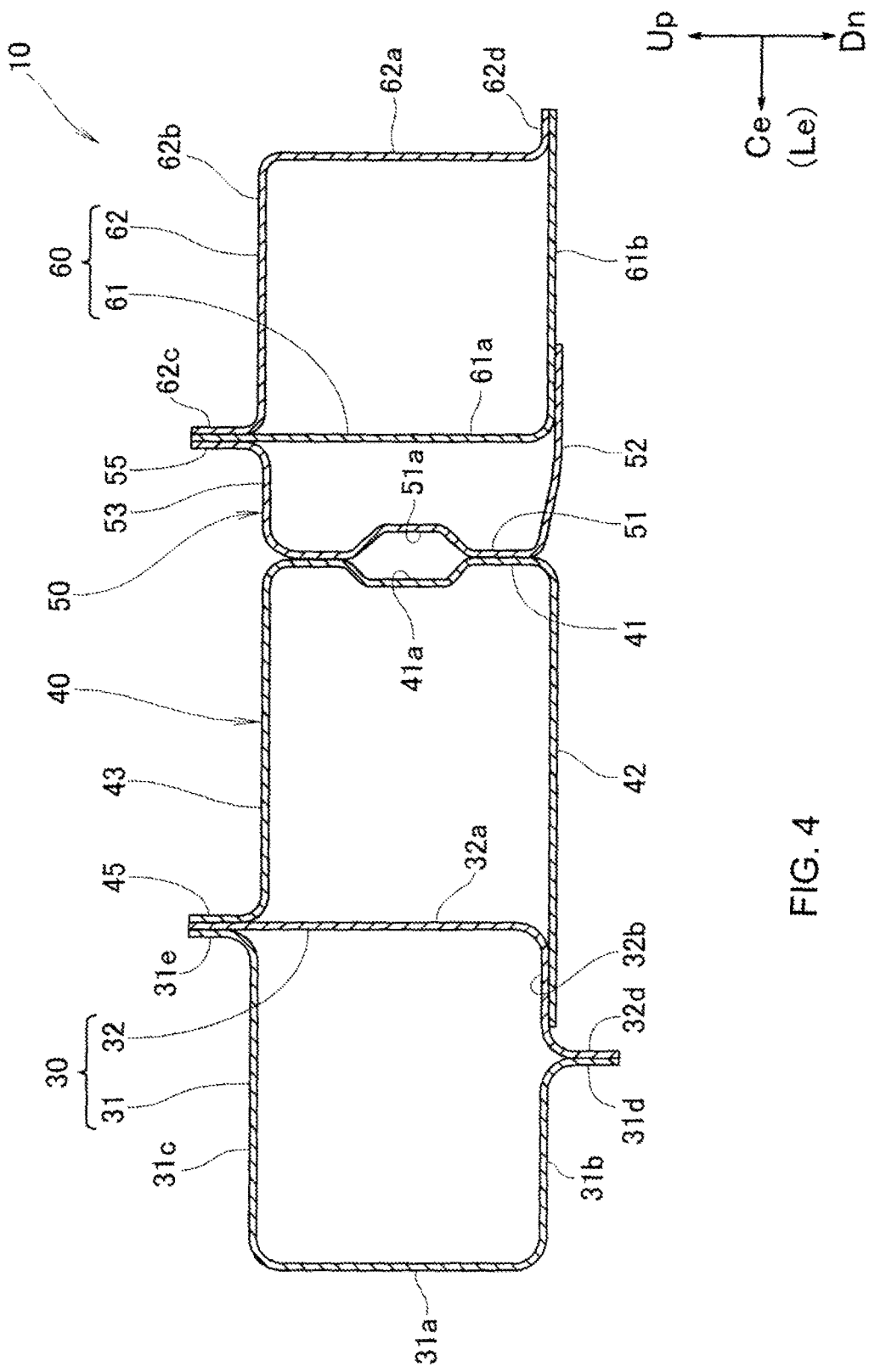
FIG. 4 is a cross-sectional view taken along line IV-IV of FIG. 2.

With reference to FIG. 4, the front side frame 30 includes a frame inner 31 disposed on the side of the center in the vehicle-width direction and a frame outer 32 joined so as to be laid over the outer side of the frame inner 31. The front side frame 30 has a substantially rectangular-shaped closed cross section formed by the frame inner 31 and the frame outer 32.

The frame inner 31 is a substantially U-shaped component that is open toward the frame outer 32 and includes a frame inner bottom 31a located on the side of the center in the vehicle-width direction, frame inner walls 31b, 31c extending outward in the vehicle-width direction from both ends of the frame inner bottom 31a, a frame inner lower flange 31d extending downward from an end of the frame inner wall 31b located below the frame inner wall 31c, and a frame inner upper flange 31e extending upward from an end of the frame inner wall 31c located above the frame inner wall 31b. The frame inner wall 31c located above the frame inner wall 31b is longer than the frame inner wall 31b.

The frame outer 32 is substantially L-shaped and includes a frame outer vertical wall 32a that opposes the frame inner bottom 31a, a frame outer horizontal wall 32b that extends from a lower end of the frame outer vertical wall 32a toward the frame inner wall 31b, and a frame outer lower flange 32d that extends downward from an end of the frame outer horizontal wall 32b and is welded to the frame inner lower flange 31d. The upper end of the frame outer vertical wall 32a is welded to the frame inner upper flange 31e.

The first, load transmitting member 40 is substantially U-shaped when viewed in the cross-sectional view along the vehicle-width direction and is open toward the front side frame 30. The first, load transmitting member 40 includes a bottom 41 that is located on the outer side of the frame outer vertical wall 32a so as to be opposed to the frame outer vertical wall 32a, lower and upper walls 42, 43 extending from both ends of the bottom 41 toward the center-in the vehicle-width direction, and a first flange 45 that extends upward from an end of the upper wall 43 along the frame outer vertical wall 32a.

The bottom 41 has a first groove 41a that is formed approximately at the center thereof in the vertical direction so as to be away from the second load transmitting member 50. The first, groove 41a is formed in a continuous manner in the longitudinal direction.

With reference to FIG. 3 and FIG. 4, the upper wall 43 is a substantially triangular-shaped component, when viewed in plan view, that is tapering from a front end toward a rear end thereof. This is the case with the lower wall 42 as well.

The second load transmitting member 50 is joined to and along the bottom 41 and includes a reinforcing portion 51 joined to the bottom 41, lower and upper bent portions 52, 53 (horizontally extending portions) that are formed by bending lower and upper ends of the reinforcing portion 51 toward the outer side, respectively, and a second flange 55 that is formed by bending an end of the upper bent portion 53 upward so as to be joined to the lower member 60.

The reinforcing portion 51 has a second groove 51a formed away from the bottom 41. The second groove 51a is formed in a continuous manner in the longitudinal direction.

Figure 5:
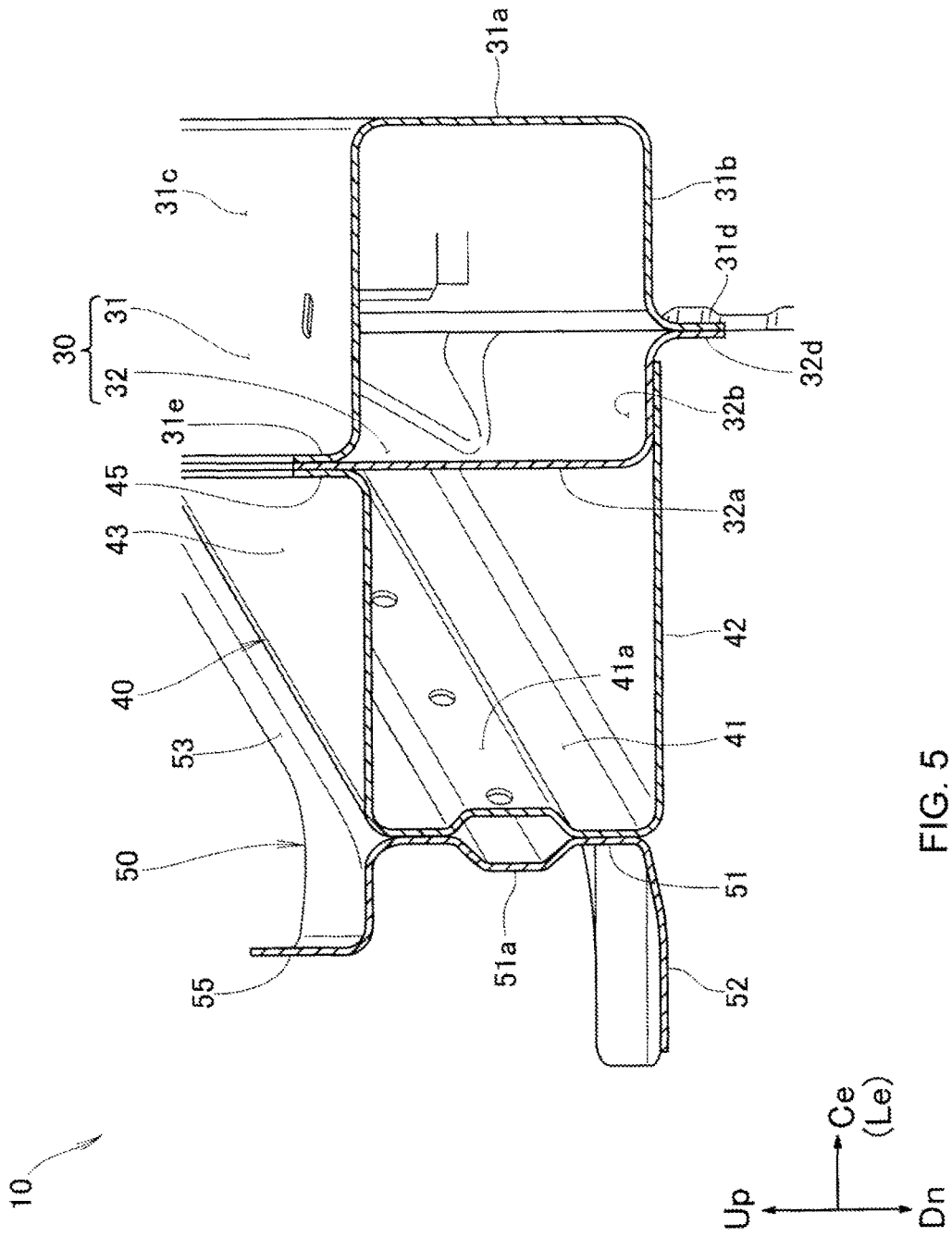
FIG. 5 is a cross-sectional view taken along line V-V of FIG. 3.

With reference to FIG. 5, the front side frame 30, the first load transmitting member 40, and the second load transmitting member 50, all of which are viewed from the front, are shown in FIG. 5. Note that the right and left sides of FIG. 5 respectively correspond to the left and right, sides of FIGS. 2 through 4.

Due to being opposed to each other, the first groove 41a and the second groove 51a together forms a substantially hexagonally-shaped closed cross section. Both the first groove 41a and the second groove 51a are formed in a continuous manner in the longitudinal direction. With this arrangement, the closed cross section is also formed in a continuous manner in the longitudinal direction.

With reference to FIGS. 3 and 4, the second load transmitting member 50 is joined at a front end thereof to the coupling member 26 and the lower member 60 and is joined at a rear end thereof to the front side frame 30. The rear-end of the second load transmitting member 50 is located behind the rear end of the first load transmitting member 40 so as to be close to the fragile portion 30b (see FIG. 1).

With reference to FIG. 4, the lower member 60 includes a lower member inner 61 disposed on the side of the center in the vehicle-width direction and a lower member outer 62 joined so as to be laid over the outer side of the lower member inner 61. The lower member 60 has a substantially rectangular-shaped closed cross section formed by the lower member inner 61 and the lower member outer 62.

The lower member inner 61 is substantially L-shaped and includes an inner vertical wall 61a that opposes to the reinforcing portion 51 of the second load transmitting member 50 and an inner horizontal wall 61b extending outward in the vehicle-width direction from the lower end of the inner vertical wall 61a.

The lower member outer 62 is substantially L-shaped and includes an outer vertical wall 62a opposed to the inner vertical wall 61a, an outer horizontal wall 62b extending from the upper end of the outer vertical wall 62a toward the inner vertical wall 61a, a lower member upper flange 62c: that extends upward from the end of the outer horizontal wall 62b and is welded to the end of the inner vertical wall 61a, and a lower member lower flange 62d that extends outward in the vehicle-width direction from the end of the outer vertical wall 62a and is welded to the end of the inner horizontal wall 61b.

With this arrangement according to the first embodiment, the following benefits are provided.

With reference to FIG. 5, the first load transmitting member 40 includes a substantially U-shaped component having an opening toward the front side frame 30, the substantially U-shaped component having the second load transmitting member 50, which is like a longitudinal plate, joined along a bottom 41 thereof. The bottom 41 and the second load transmitting member 50 together form a closed cross section in a continuous manner in the longitudinal direction.

With reference to FIG. 3 and FIG. 5, in the event of a narrow offset impact in which an impact load is applied to the outer side in the vehicle-width direction, such an impact load is transmitted from the bottom 41 of the first load transmitting member 40 and the second load transmitting member 50 to the front side frame 30. A closed cross section formed by the bottom 41 of the first load transmitting member 40 and the second load transmitting member 50 reduces or prevents a deformation of these members or portions caused by an impact load. No expensive material needs to be used for the first load transmitting member 40 and the second load transmitting member 50 to reduce or prevent such a deformation. In addition, compared with a load transmitting member having a larger plate thickness, an increase in weight can also be reduced or prevented because of the structure in which the second load transmitting member 50 is simply joined to the bottom 41. Consequently, a high impact-energy absorbing vehicle front structure can be provided despite being inexpensive and lightweight.

In particular, it is preferable that the first and second load transmitting members 40, 50 have grooves 41a, 51a formed therein, respectively, that are opposed to each other so as to form a closed cross section. This allows a larger closed cross section to be formed without the first and second load transmitting members 40, 50 becoming larger.

In addition, the second load transmitting member 50 has the bent, upper and lower ends 52, 53 (horizontally extending portions 52, 53) which extend in a horizontal direction from the upper end and the lower end, respectively. This enhances bending rigidity of the second load transmitting member 50, which reduces or prevents the deformation caused by an impact load and enables an impact load to be more securely transmitted to the front side frame 30.

With reference to FIG. 2, the second load transmitting member 50 is continuous from the first, load transmitting member 40 formed substantially in the shape of a triangle when viewed in plan view and is joined to the front side frame 30. The apex of the first, load transmitting member 40 easily becomes detached from the front, side frame 30 when viewed in plan view. The extension of the second load transmitting member 50 to the front side frame 30 enables the apex P1 of the first load transmitting member 40 to be placed between the second load transmitting member 50 and the front side frame 30. This prevents the first load transmitting member 40 from being detached from the front, side frame 30, whereby an impact load can be more securely transmitted to the front side frame 30.

In addition, the second load transmitting member 50 is continuous from the first load transmitting member 40 formed substantially in the shape of a triangle when viewed in plan view and is joined to the coupling member 26. The apex of the first load transmitting member 40 easily becomes detached from the coupling member 26 when viewed in plan view. The extension of the second load transmitting member 50 to the coupling member 26 enables the apex P2 of the first load transmitting member 40 to be placed between the second load transmitting member 50 and the coupling member 26. This prevents the first load transmitting member 40 from being detached from the coupling member 26, whereby an impact load can be more securely transmitted to the front side frame 30.

In addition, the second load transmitting member 50 extends close to the fragile portion 30b formed in the front side frame 30. This enables an impact load to be securely transmitted close to the fragile portion 30b at which the front side frame 30 can be forced to be bent. With this arrangement, impact energy can be absorbed in a stable manner. If the power unit 19 (see FIG. 1) is used to absorb impact energy, settings according to the type of the power unit 19 must be changed. In this disclosure, the front side frame 30 is made to bend at the fragile portion 30b, eliminating the need for changing the settings according to the type of the power unit 19, which enhances general-purpose properties.

In addition, the front end and the outer side in the vehicle-width direction of the second load transmitting member 50 are joined to the lower member 60. With this arrangement, the lower member 60 is made to deform in conjunction with the deformation of the front side frame 30, whereby more impact energy can be absorbed.

In addition, the bumper beam extension 27 extends from the front end of the front side frame 30 to the front end of the lower member 60. The disposition of the bumper beam extension 27 in front of the first and second load transmitting members 40, 50 enables an impact load to be more securely transmitted from the first and second load transmitting members 40, 50 to the front side frame 30 and the lower member 60 in the event of a narrow offset impact, Furthermore, the front surface of the bumper beam extension 27, when viewed in plan view, has its outer side in the vehicle-width direction located at the rear of its center in the vehicle-width direction. This enables an impact load to be more securely transmitted from the first and second load transmitting members 40, 50 to the front side frame 30 in the event of a narrow offset impact.

With reference to FIG. 3 and FIG. 2, the second groove 51a is formed so as to be connected to the rear-surface of the coupling member 26, whereby a closed cross section is formed by the second groove 51a and the rear surface of the coupling member 26. This arrangement reduces or prevents the deformation of the second load transmitting member 50, thereby more securely transmitting an impact load in the rearward direction from the coupling member 26.

In addition, upper and lower flange-like portions formed by bending upper and lower ends of the second load transmitting member 50 have the largest width at the front end of the second load transmitting member 50 where the second load transmitting member 50 is connected to the lower-member 60, whereby an impact load can be more securely transmitted to the lower member 60.

Second Embodiment

Figure 6:
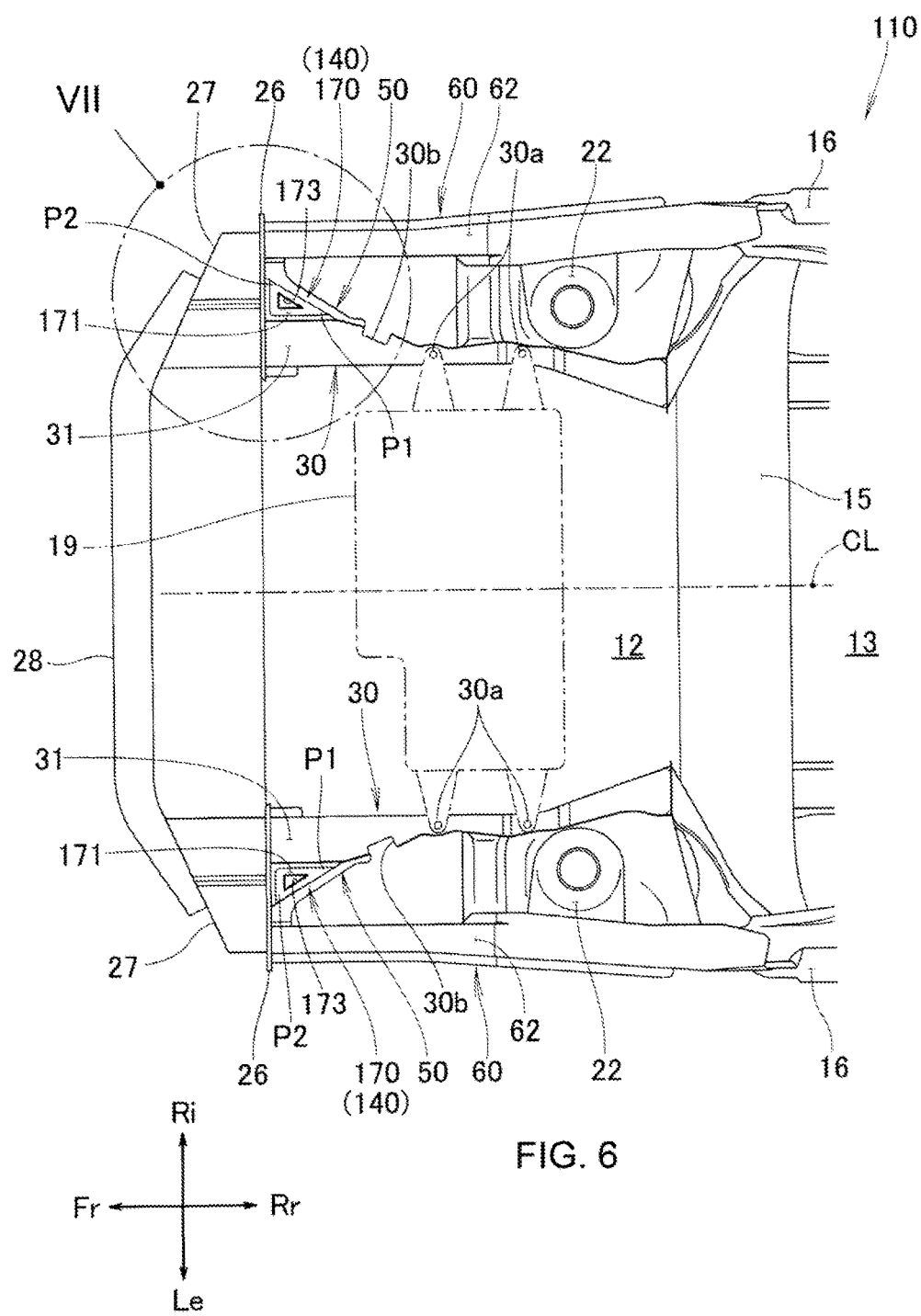
FIG. 6 is a plan view of a vehicle front structure according to a second embodiment of the present disclosure.

With reference to FIG. 6, a vehicle body 110 has an engine compartment 12 at the front thereof and a passenger compartment 13 located just, behind the engine compartment 12, as shown in FIG. 6. The vehicle body 10 includes a monocoque body that is substantially symmetrical about a vehicle-width center line CL extending in the longitudinal direction of the vehicle through the center in the vehicle-width direction.

The engine compartment 12 and the passenger compartment 13 are partitioned with a dashboard lower panel 15. Both ends of the dashboard lower panel 15 are joined to right and left front pillars 16, 16, respectively.

The vehicle body 110 includes right and left front side frames 30, 30 and right and left lower members 60, 60 that, when viewed in plan view, are located on the outer side of the right and left front side frames 30, 30. The right and left front side frames 30, 30 are located at the right and left ends of the front of the vehicle body 110 and extend in the longitudinal direction of the vehicle body 110. A power unit 19 is disposed between the right and left front side frames 30, 30.

The right and left damper housings 22, 22 are placed over and across the right and left front side frames 30, 30 and the right and left lower members 60, 60, respectively.

FIGS. 7 through 11 show the right, front section of the vehicle front structure. The left front section has the same structure as the right front section. Accordingly, descriptions of only the right front section will be provided below and descriptions of the left front section will be omitted. Descriptions of the right front section may be replaced by descriptions of the left front section, when relevant.

Figure 7:
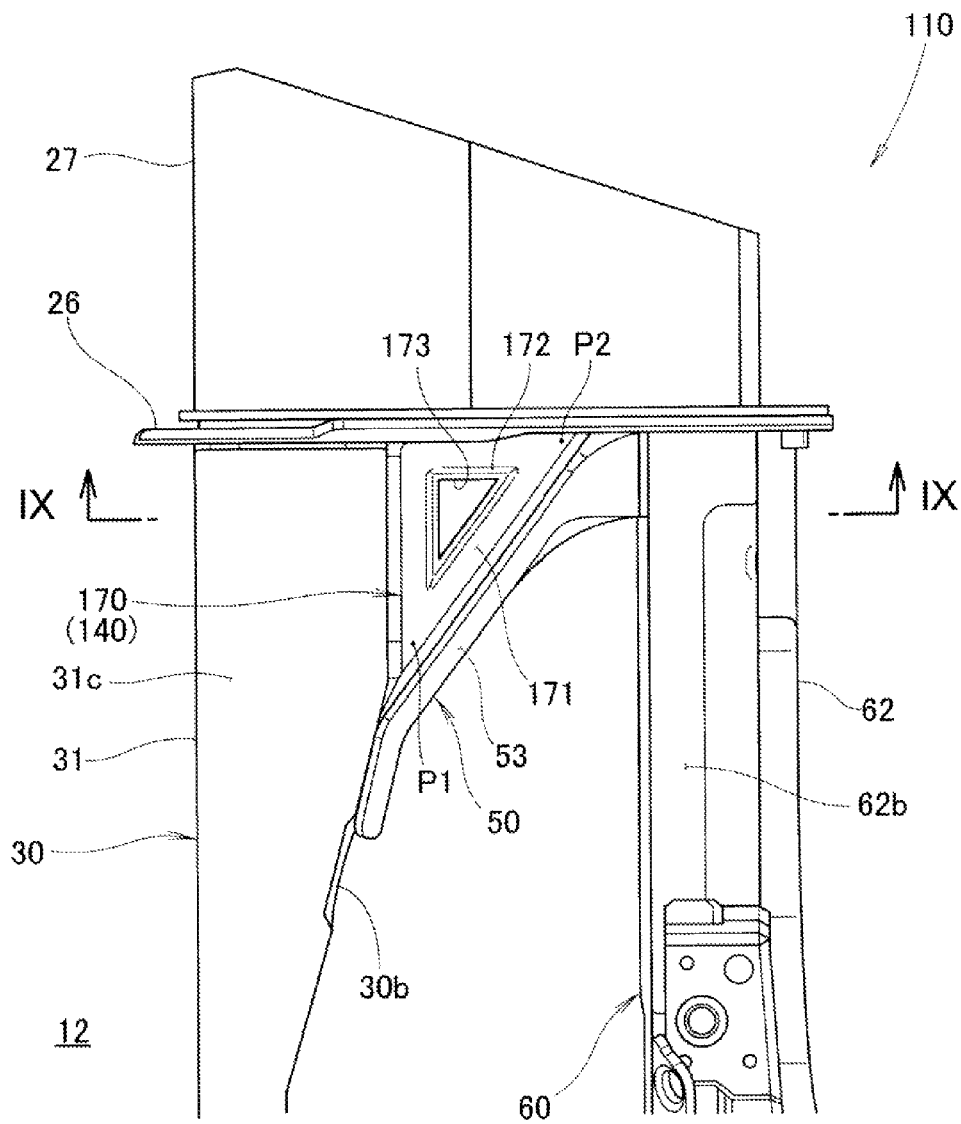
FIG. 7 is an enlarged view of a section VII of FIG. 6.
Figure 8:
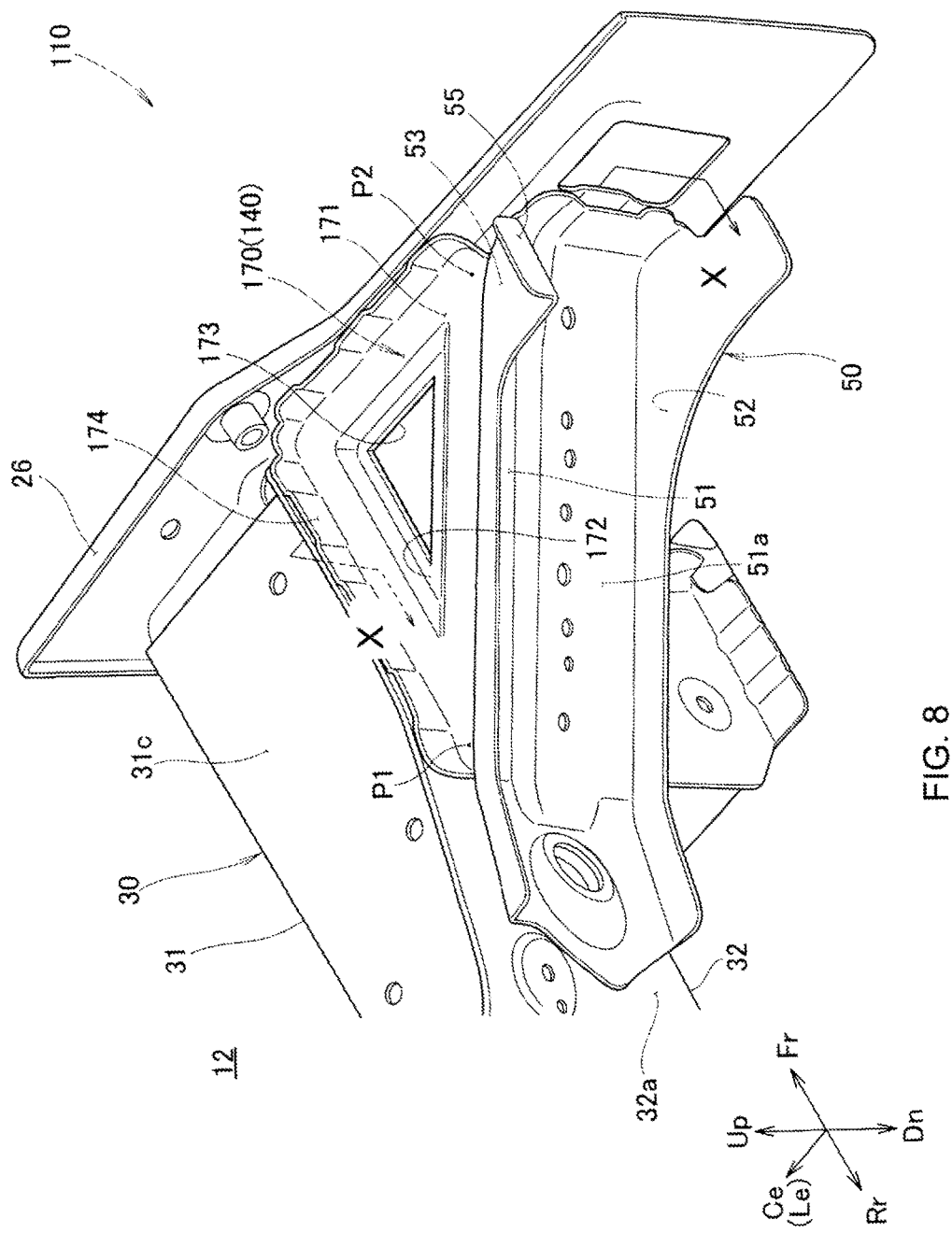
FIG. 8 is a perspective view of a front side frame, a first load transmitting member, a second load transmitting member, and a coupling member shown in FIG. 7.

With reference to FIGS. 7 and 8, a first load transmitting member 140 that is substantially triangular-shaped when viewed in plan view is joined to the front side frame 30 so as to contact with a front end and an outer-surface in the vehicle-width direction of the front side frame 30. A second load transmitting member 50 like a longitudinal plate is joined to the first load transmitting member 40 so as to be disposed along the first load transmitting member 140. The second load transmitting member 50 is joined to the lower member 60 at a front end and an outer side in the vehicle-width direction thereof. The front side frame 30, the first load transmitting member 140, the second load transmitting member 50, and the lower member 60 are joined at front ends thereof to a coupling member 26 made of a metal plate. A bumper beam extension 27 that can absorb an impact load through deformation is joined to a front end of the coupling member 26.

With reference to FIG. 6, a bumper beam 28 is placed across the right and left bumper beam extensions 27.

The front side frame 30 has a mount fastening portion 30a for fastening the power unit 19 and a fragile portion 30b that is located in front of the mount fastening portion 30a and in the rear of the first load transmitting member.

The fragile portion 30b is a substantially U-shaped part when viewed in plan view and has a smaller width than adjacent parts. The fragile portion 30b has a smaller sectional area than any other part in the front side frame 30 and, as a result, has lower bending rigidity.

Figure 9:
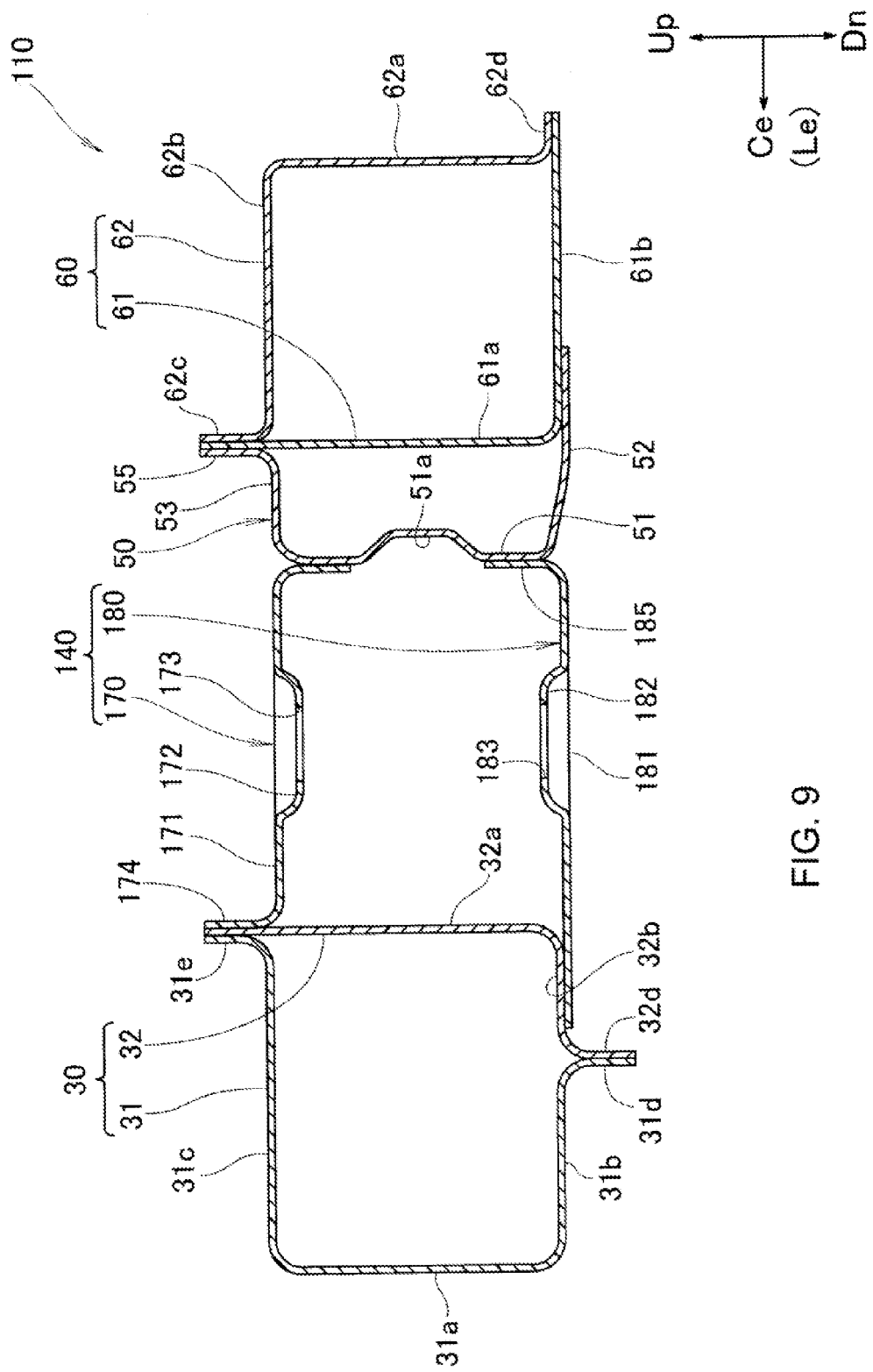
FIG. 9 is a cross-sectional view taken along line IX-IX of FIG. 7.

With reference to FIG. 9, the front side frame 30 includes a frame inner 31 disposed on the side of the center in the vehicle-width direction and a frame outer 32 joined so as to be laid over the outer side of the frame inner 31. The front side frame 30 has a substantially rectangular-shaped closed cross section formed by the frame inner 31 and the frame outer 32.

The frame inner 31 is a substantially U-shaped component that is open toward the frame outer 32 and includes a frame inner bottom 31a located on the side of the center in the vehicle-width direction, frame inner walls 31b, 31c extending outward in the vehicle-width direction from both ends of the frame inner bottom 31a, a frame inner lower flange 31d extending downward from an end of the frame inner wall 31b located below the frame inner wall 31c, and a frame inner upper flange 31e extending upward from an end of the frame inner wall 31c located above the frame inner wall 31b. The frame inner wall 31c located above the frame inner wall 31b is longer than the frame inner wall 31b.

The frame outer 32 is substantially L-shaped and includes a frame outer vertical wall 32a that opposes the frame inner bottom 31a, a frame outer horizontal wall 32b that extends from a lower end of the frame outer vertical wall 32a toward the frame inner wall 31b, and a frame outer-lower flange 32d that extends downward from an end of the frame outer horizontal wall 32b and is welded to the frame inner lower flange 31d, The upper end of the frame outer vertical wall 32a is welded to the frame inner upper flange 31e.

The first load transmitting member 140 includes an upper first load transmitting member 170 and a lower first load transmitting member 180. The upper first load transmitting member 170 is made of a first plate member and joined to an upper portion of the front side frame 30. The lower first load transmitting member 180 is made of a second plate member which is different, from the first plate member, and joined to a lower portion of the front side frame 30.

Referring to FIG. 8 as well, the upper first load transmitting member 170 includes an upper body portion 171 having a substantially triangle shape, an upper bead 172 recessed downward along each side of the triangle shape of the upper body portion 171, an upper opening 173 having a substantially triangle shape and opened along each side of the upper bead 172, an upper first flange 174 bent upward from an edge of the upper body portion 171 located inner side with respect to the vehicle width direction and joined to the frame outer 32, and an upper second flange 175 (upper flange 175) bent, downward from an edge of the upper body portion 171 located outer side with respect to the vehicle width direction and joined to the second load transmitting member 50. The upper second flange 175 extends downward and is joined to the second load transmitting member 50.

The lower first load transmitting member 180 includes a lower body portion 181 having a substantially triangle shape, a lower bead 182 recessed upward along each side of the triangle shape of the lower body portion 181, a lower opening 183 having a substantially triangle shape and opened along each side of the lower bead 182, and a lower flange 185 bent upward from an edge of the lower body portion 181 located outer side with respect to the vehicle width direction and joined to the second load transmitting member 50. The lower flange 185 extends upward and is joined to the second load transmitting member 50.

The second load transmitting member 50 is joined to and along the first load transmitting member 140 and includes a reinforcing portion 51 joined to the second upper flange 175 and the lower flange 185, lower and upper bent portions 52, 53 (horizontally extending portions) that are formed by bending lower and upper ends of the reinforcing portion 51 toward the outer side, respectively, and a second flange 55 that is formed by bending an end of the upper bent portion 53 upward so as to be joined to the lower member 60.

The reinforcing portion 51 has a second groove 51a formed away from the first load transmitting member 140. The second groove 51a is formed in a continuous manner in the longitudinal direction.

Figure 10:
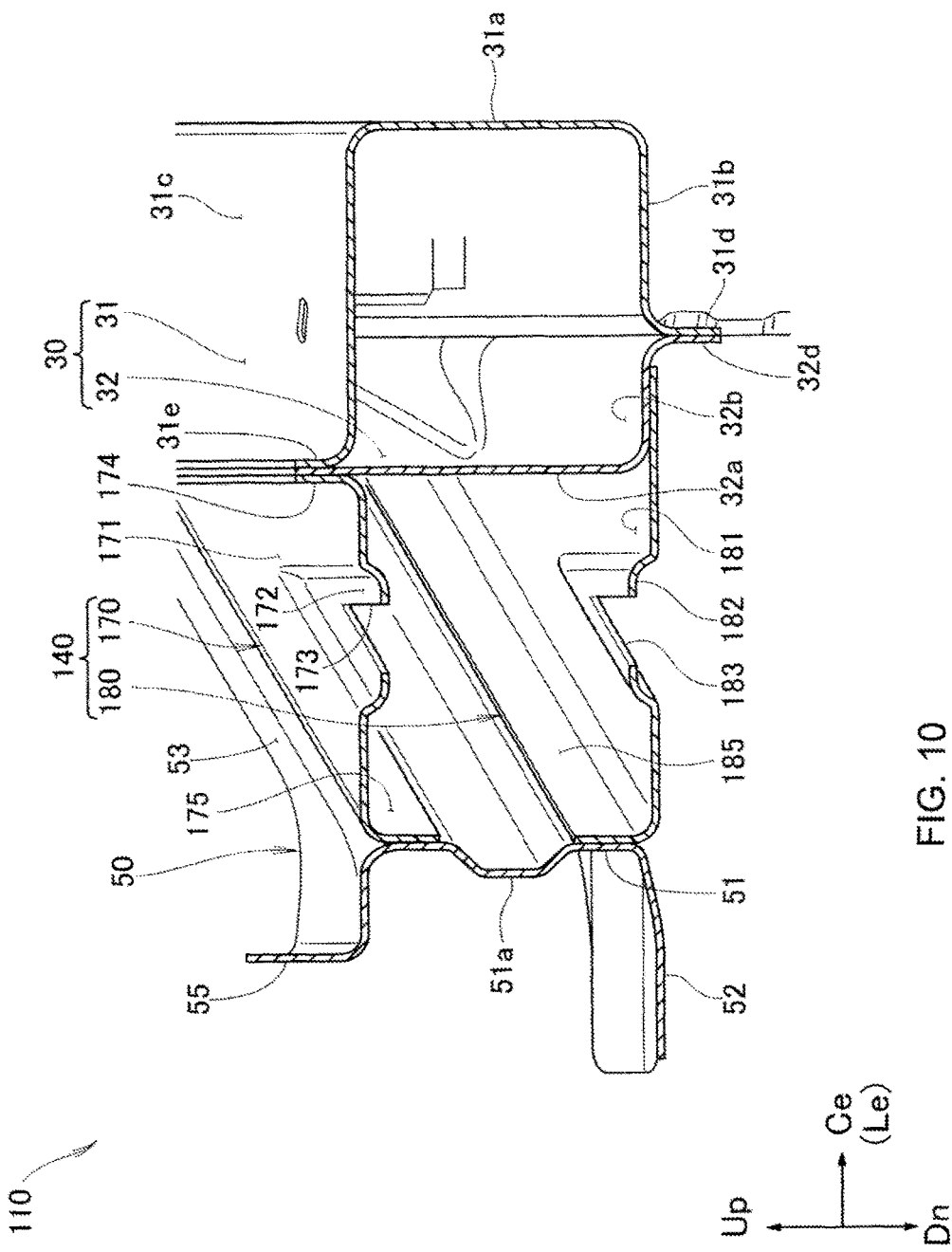
FIG. 10 is a cross-sectional view taken along line X-X of FIG. 8.

With reference to FIG. 10 as well, the front side frame 30, the first load transmitting member 140, and the second load transmitting member 50, all of which are viewed from the front, are shown in FIG. 10. Note that the right and left sides of FIG. 10 respectively correspond to the left and right sides of FIGS. 7 through 9.

The front side frame 30 (frame outer 32), the first load transmitting member 170, the lower first load transmitting member 180, and the second load transmitting member 50 form a closed cross section. The closed cross section is also formed in a continuous manner in the longitudinal direction.

With reference to FIGS. 8 and 9, the second load transmitting member 50 is joined at a front end thereof to the coupling member 26 and the lower member 60 and is joined at a rear end thereof to the front side frame 30. The rear end of the second load transmitting member 50 is located behind the rear end of the first load transmitting member 140 so as to be close to the fragile portion 30b (see FIG. 6).

With reference to FIG. 9, the lower member 60 includes a lower member inner 61 disposed on the side of the center in the vehicle-width direction and a lower member outer 62 joined so as to be laid over the outer side of the lower member inner 61. The lower member 60 has a substantially rectangular-shaped closed cross section formed by the lower member inner 61 and the lower member outer 62.

The lower member inner 61 is substantially L-shaped and includes an inner vertical wall 61a that opposes to the reinforcing portion 51 of the second load transmitting member 50 and an inner horizontal wall 61b extending outward in the vehicle-width direction from the lower end of the inner vertical wall 61a.

The lower member outer 62 is substantially L-shaped and includes an outer vertical wall 62a opposed to the inner vertical wall 61a, an outer horizontal wall 62b extending from the upper end of the outer vertical wall 62a toward the inner vertical wall 61a, a lower member upper flange 62c: that extends upward from the end of the outer horizontal wall 62b and is welded to the end of the inner vertical wall 61a, and a lower member lower flange 62d that extends outward in the vehicle-width direction from the end of the outer vertical wall 62a and is welded to the end of the inner horizontal wall 61b.

With this arrangement according to the second embodiment, the following benefits are provided.

Figure 11:
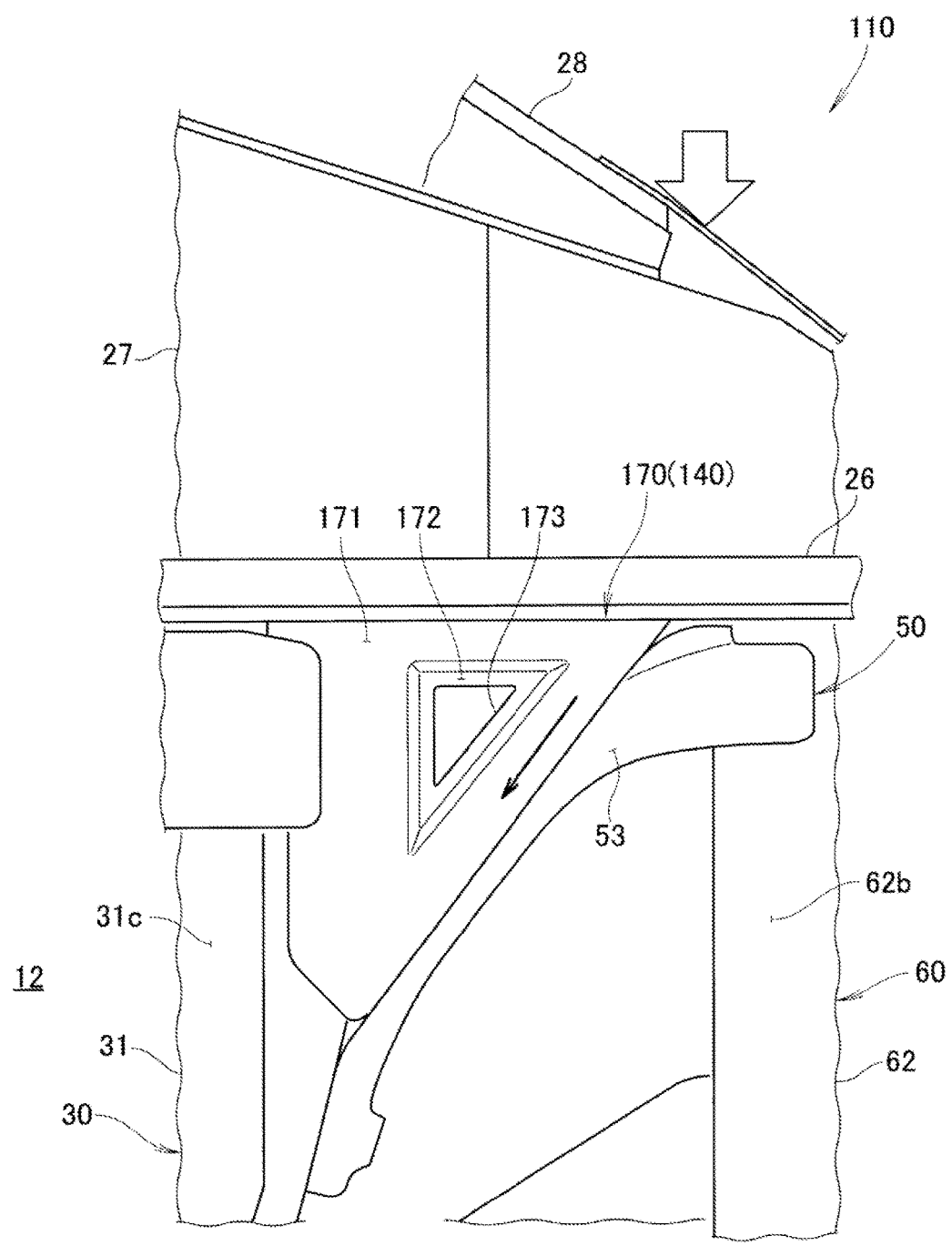
FIG. 11 is a drawing describing operation of the vehicle front structure of FIG. 6.

The front side frame 30 (frame outer 32), the plate-shaped upper first load transmitting member 170, the plate-shaped lower first load transmitting member 180, and the vertical plate shaped second load transmitting member 50 form a closed cross section. With reference to FIG. 11 as well, in the event of a narrow offset, impact in which an impact load is applied to the outer side in the vehicle-width direction, such an impact, load is transmitted from the first, load transmitting member 40 and the second load transmitting member 50 to the front side frame 30. A thus formed closed cross section reduces or prevents a deformation of these members or portions caused by an impact load. No expensive material needs to be used for the first load transmitting member 140 and the second load transmitting member 50 to reduce or prevent such a deformation. In addition, compared with a load transmitting member having a larger plate thickness, an increase in weight can also be reduced or prevented because of the structure in which the three plate members are simply joined to one another. Consequently, a high impact-energy absorbing vehicle front structure can be provided despite being inexpensive and lightweight.

In addition, the first load transmitting member 140 is made of the plate shaped upper first load transmitting member 170 and the plate shaped lower first load transmitting member 180. By constituting the first load transmitting member 140 using the two plate shaped members, the first load transmitting member 140 may be formed by using press molding process only. In other words, easier manufacturing process may be embodied compared to the first load transmitting member (FIG. 5, reference numeral "40") which requires deep drawing process.

Moreover, the upper first load transmitting member 170 and the lower first load transmitting member 180 include substantially triangle upper and lower beads 172, 182 which are formed along each side of the triangle shape, respectively. This enhances bending rigidity of the first load transmitting member 140, which reduces or prevents the deformation caused by an impact load and enables an impact load to be more securely transmitted to the front side frame 30.

Furthermore, ridgelines are provided by forming the upper bead 172 and the lower bead 182. Thus, the impact load may be transmitted to the front side frame 30 through thus provided ridgelines and enables the impact load to be more securely transmitted to the front side frame 30.

In the upper bead 172 and the lower bead 182, the substantially triangle upper and lower openings 173, 183 are formed along each side of the upper bead 172 and the lower bead 182, respectively. The inside parts of the upper bead 172 and the lower bead 182 have less contribution to the transmission of the impact load. The inside parts of the upper bead 172 and the lower bead 182 include the upper opening 173 and the lower opening 183 formed therein. This structure allows reducing weight while preventing decrease in impact load transmission efficiency.

With reference to FIG. 10, the second load transmitting member 50 has the bent, upper and lower ends 52, 53 (horizontally extending portions 52, 53) which extend in a horizontal direction from the upper end and the lower end, respectively. This enhances bending rigidity of the second load transmitting member 50, which reduces or prevents the deformation caused by an impact load and enables an impact load to be more securely transmitted to the front side frame 30.

With reference to FIG. 7, the second load transmitting member 50 is continuous from the first, load transmitting member 140 formed substantially in the shape of a triangle when viewed in plan view and is joined to the front side frame 30. The apex P1 of the first load transmitting member 140 easily becomes detached from the front, side frame 30 when viewed in plan view. The extension of the second load transmitting member 50 to the front side frame 30 enables the apex P1 of the first load transmitting member 40 to be placed between the second load transmitting member 50 and the front side frame 30. This prevents the first load transmitting member 140 from being detached from the front side frame 30, whereby an impact load can be more securely transmitted to the front side frame 30.

In addition, the second load transmitting member 50 is continuous from the first load transmitting member 140 formed substantially in the shape of a triangle when viewed in plan view and is joined to the coupling member 26. The apex of the first load transmitting member 140 easily becomes detached from the coupling member 26 when viewed in plan view. The extension of the second load transmitting member 50 to the coupling member 26 enables the apex P2 of the first load transmitting member 140 to be placed between the second load transmitting member 50 and the coupling member 26. This prevents the first load transmitting member 140 from being detached from the coupling member 26, whereby an impact load can be more securely transmitted to the front-side frame 30.

In addition, the second load transmitting member 50 extends close to the fragile portion 30b formed in the front side frame 30. This enables an impact load to be securely transmitted close to the fragile portion 30b at which the front side frame 30 can be forced to be bent. With this arrangement, impact energy can be absorbed in a stable manner. If the power unit 19 (see FIG. 6) is used to absorb impact, energy, settings according to the type of the power unit 19 must be changed. In this disclosure, the front, side frame 30 is made to bend at the fragile portion 30b, eliminating the need for changing the settings according to the type of the power unit 19, which enhances general-purpose properties.

In addition, the front end and the outer side in the vehicle-width direction of the second load transmitting member 50 are joined to the lower member 60. With this arrangement, the lower member 60 is made to deform in conjunction with the deformation of the front side frame 30, whereby more impact energy can be absorbed.

In addition, the bumper beam extension 27 extends from the front end of the front, side frame 30 to the front end of the lower member 60. The disposition of the bumper beam extension 27 in front of the first and second load transmitting members 140, 50 enables an impact load to be more securely transmitted from the first and second load transmitting members 140, 50 to the front, side frame 30 and the lower member 60 in the event of a narrow offset impact.

Furthermore, the front surface of the bumper beam extension 27, when viewed in plan view, has its outer side in the vehicle-width direction located at the rear of its center in the vehicle-width direction (that is, rearwardly offset). This enables an impact load to be more securely transmitted from the first and second load transmitting members 140, 50 to the front side frame 30 in the event of a narrow offset impact.

With reference to FIG. 8 as well, the second groove 51a is formed so as to be connected to the rear surface of the coupling member 26, whereby a closed cross section is formed by the second groove 51a and the rear surface of the coupling member 26. This arrangement reduces or prevents the deformation of the second load transmitting member 50, thereby more securely transmitting an impact load in the rearward direction from the coupling member 26.

In addition, the horizontally extending portions 52, 53 horizontally extending from the upper and lower ends of the second load transmitting member 50 have the largest width at the front end of the second load transmitting member 50 where the second load transmitting member 50 is connected to the lower member 60, whereby an impact, load can be more securely transmitted to the lower member 60.

The present, application is typically described with reference to, but not limited to, the foregoing embodiments.

The vehicle front structure according to the present application is suitable for passenger vehicle bodies. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle front structure comprising:
a front side frame extending in a longitudinal direction of a vehicle;
a first load transmitting member joined to a front end and an outer surface in a vehicle-width direction of the front side frame, the first load transmitting member having a width tapering from a front of the vehicle toward a rear of the vehicle so as to have a substantially triangle shape when viewed in plan view,
wherein the first load transmitting member includes a substantially U-shaped portion that is open toward the front-side frame;
wherein the vehicle front structure further comprises a longitudinal-plate-shape second load transmitting member joined to and along a bottom of the substantially U-shaped portion of the first load transmitting member; and
wherein the first load transmitting member includes a first groove formed at a part of the bottom thereof, the first groove being recessed in a direction away from the second load transmitting member such that a closed cross section is profiled by the bottom of the first load transmitting member and the second load transmitting member in a continuous manner in the longitudinal direction of the vehicle.

2. The vehicle front structure according to claim 1, wherein the second load transmitting member is continuous from the first load transmitting member so as to be joined to the front side frame.

3. The vehicle front structure according to claim 1, wherein the front side frame includes a fragile portion formed in the rear of the first load transmitting member and a rear end of the second load transmitting member extends close to the fragile portion beyond the rear end of the first load transmitting member.

4. The vehicle front structure according to claim 1, further comprises a coupling member joined to the front end of the front side frame and a front end of the first load transmitting member in a continuous manner so as to couple the front side frame and the first load transmitting member together,
wherein the second load transmitting member is continuous from the first load transmitting member so as to be joined to the coupling member.

5. The vehicle front structure according to claim 1, wherein the second load transmitting member includes an upper horizontally extending portion extending horizontally from an upper end of thereof and a lower extending portion extending horizontally from a lower end of thereof.

6. The vehicle front structure according to claim 1, further comprising:
a lower member extending in the longitudinal direction and disposed on the outer side in the vehicle-width direction of the front side frame,
wherein the second load transmitting member includes a front end and an outer side in the vehicle-width direction, both connected to the lower member.

7. The vehicle front structure according to claim 1, further comprising:
a bumper beam extension mounted on the front of the coupling member, and collapsible or deformable so as to be able to absorb an impact load,
wherein the bumper beam extension extends from the front, of the front side frame to the front of the lower member.

8. The vehicle front structure according to claim 1, wherein the second load transmitting member includes a second groove opposite to the first groove, the second groove being recessed in a direction away from the first load transmitting member, the second groove extending along the longitudinal direction of the vehicle.

9. The vehicle front structure according to claim 8, wherein the second load transmitting member includes a front, end joined to the coupling member, and
the second groove extends to the front end of the second load transmitting member such that a closed cross section is profiled by the second groove and surface of the coupling member.

10. The vehicle front structure according to claim 5, wherein the upper and lower ends of the second load transmitting member are bent to make an upper flange and a lower flange, and
the upper flange and the lower flange each has the largest, width at a front end of the second load transmitting member.

11. The vehicle front structure according to claim 2, wherein the second load transmitting member covers an end of a joint portion of the first load transmitting member to the front side frame.

12. The vehicle front structure according to claim 4, wherein the second load transmitting member covers an end of a joint portion of the first load transmitting member to the coupling member.

13. The vehicle front structure according to claim 1, wherein the first load transmitting member includes an upper wall and a lower wall extending from an upper end and a lower end of the bottom such that the upper wall , the lower wall and the bottom constitute the substantially U-shaped portion, and
wherein one of the upper wall and the lower wail includes a bead profiled along each side of the substantially triangle shape, and
wherein the bead has substantially triangle shape.

14. The vehicle front structure according to claim 13, wherein the bead includes an opening profiled along each side of the bead.

15. A vehicle front structure comprising:
a front side frame extending in a longitudinal direction of a vehicle;
a first load transmitting member joined to a front end and an outer surface in a vehicle-width direction of the front side frame, the first load transmitting member having a width tapering from a front of the vehicle toward a rear of the vehicle so as to have a substantially triangle shape when viewed in plan view; and
a coupling member joined to the front end of the front side frame and a front end of the first load transmitting member in a continuous manner so as to couple the front side frame and the first load transmitting member together, wherein the first load transmitting member includes a substantially U-shaped portion that is open toward the front side frame;

wherein the vehicle front structure further comprises a longitudinal-plate-shape second load transmitting member joined to and along a bottom of the substantially U-shaped portion of the first load transmitting member; and wherein the second load transmitting member includes a second groove, the second groove being recessed in a direction away from the bottom of the first load transmitting member such that a closed cross section is profiled by the bottom of the first load transmitting member and the second load transmitting member in a continuous manner in the longitudinal direction of the vehicle.

16. A vehicle front structure comprising:

a front side frame extending in a longitudinal direction of a vehicle;

a first load transmitting member joined to a front end and an outer surface in a vehicle-width direction of the front side frame, the first load transmitting member having a width tapering from a front of the vehicle toward a rear of the vehicle so as to have a substantially triangle shape when viewed in plan view; and a longitudinal-plate-shape second load transmitting member extending along the first load transmitting member so as to sandwich the first load transmitting member between the second load transmitting member and the front side frame, wherein the first load transmitting member includes an upper first load transmitting member made of a first plate member and a lower first. load transmitting member made of a second plate me miser different from the first plate member, the upper first load transmitting member being joined to an upper part of the front side frame, and the lower first load transmitting member being joined to a lower part of the front, side frame, wherein the upper first load transmitting member includes an upper flange portion extending downward and joined to the second load transmitting member, wherein the lower first load transmitting member includes a lower flange portion extending upward and joined to the second load transmitting member, wherein the front side frame, the upper first load transmitting member, the lower first load transmitting member and the second load transmitting member profile a closed cross section, and wherein a second groove is disposed in the second load transmitting member.

17. The vehicle front structure according to claim 16, wherein one of the upper first load transmitting member and the lower first load transmitting member includes a bead profiled along each side of the substantially triangle shape, and wherein the bead has substantially triangle shape.

18. The vehicle front structure according to claim 17, wherein the bead includes an opening profiled along each side of the bead.

19. A vehicle front structure comprising:

a front side frame extending in a longitudinal direction of a vehicle;

a first load transmitting member joined to a front end and an outer surface in a vehicle-width direction of the front side frame, the first, load transmitting member having a width tapering from a front of the vehicle toward a rear of the vehicle so as to have a substantially triangle shape when viewed in plan view, wherein the first load transmitting member includes a substantially U-shaped portion that is open toward the front side frame;

wherein the first load transmitting member includes one of an upper bead and a lower bead, each profiled along each side of the substantially triangle shape, wherein the upper bead and the lower bead have substantially triangle shape.

20. The vehicle front structure according to claim 19, wherein the upper bead includes an upper opening profiled along each side of the upper bead, and the lower bead includes a lower opening profiled along each side of the lower bead.

\* \* \* \* \*